UNITED STATES PATENT OFFICE.

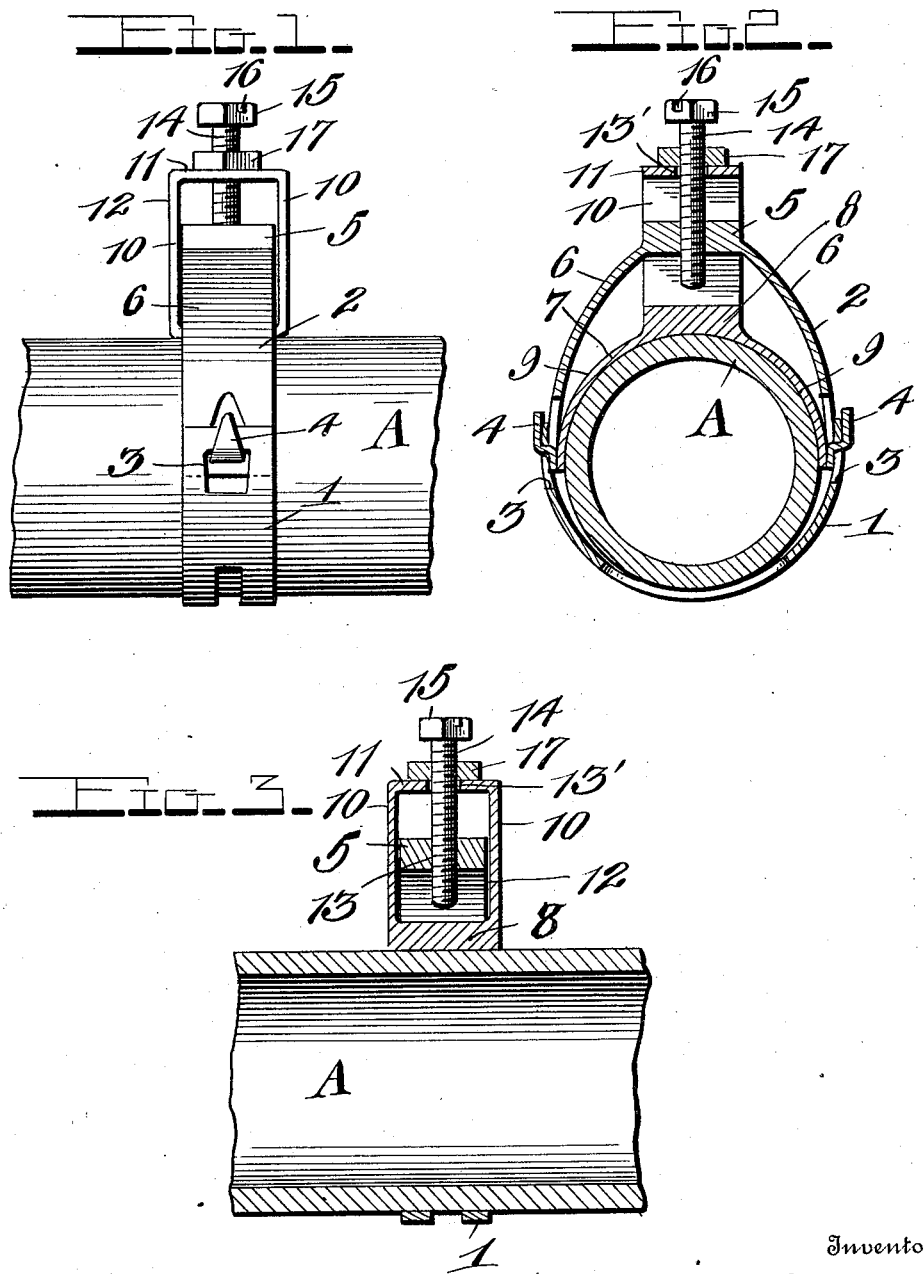

JOHN JOSEPH HIGGINS, OF THOMAS, WEST VIRGINIA.

HOSE-CLAMP.

1,008,909.   Specification of Letters Patent.   Patented Nov. 14, 1911.

Application filed January 11, 1911. Serial No. 602,079.

*To all whom it may concern:*

Be it known that I, JOHN JOSEPH HIGGINS, a citizen of the United States, residing at Thomas, in the county of Tucker and State of West Virginia, have invented certain new and useful Improvements in Hose-Clamps, of which the following is a specification, reference being had to the accompanying drawings.

This invention relates to pipe and hose clamps and has for its object to provide a device of this character that may be readily attached to or detached from a lead, cast iron, or other pipe or a hose of any material, and has for its further object to close any leak or split that may occur therein.

Another object is to produce a clamp of this character that will possess advantages in points of efficiency, durability and is inexpensive of manufacture, and at the same time being simple in construction and operation.

With the foregoing and other objects in view the invention consists in the novel features of construction, and arrangement of parts hereinafter described, pointed out in the claims, and shown in the accompanying drawings, in which:

Figure 1 is a side elevation showing my invention secured to a hose. Fig. 2 is a transverse section through the same, and, Fig. 3 is a longitudinal sectional view.

Referring more particularly to the drawings 1 and 2 indicate the clamping members, the member 1 having a small opening 3 in each end thereof, and the member 2 having a catch 4 struck up in each end adapted to engage in the openings 3 to secure the two members together around the hose A. The member 2 having a head portion 5 and the two radial arms 6 formed integral therewith.

A saddle 7 is provided having a base portion 8 and two radial arms 9 formed integral therewith. Two arms 10 are formed integral with the base portion 8 and extend upwardly and are disposed in parallel relation, their top ends are secured together by means of a cross piece 11. The arms 10 and cross piece 11 form a sleeve 12 in which is disposed the clamping member 2.

The head portion 5 is provided with a threaded opening 13 adapted to receive a threaded bolt 14, said bolt passing through an opening 13' in the cross piece 11 and a square head 15 is formed thereon, a groove 16 is formed in the head 15, so that either a screw driver or a wrench can be used to tighten or loosen the bolt.

A jam nut 17 is mounted on the bolt 14, said nut having a frictional engagement with the cross piece 11 to prevent the bolt from becoming loosened, and also to get a longer purchase when tightening the clamping members. The clamping members 1 and 2 being somewhat resilient so that when they are clamped on a pipe and tightened by the bolt 14 they will readily conform to the shape thereof. The use of this clamp is to secure a tight joint at the place of a break or split in a pipe, hose or rubber tire, and to do this quickly and easily without the use of any other mechanism.

While I have shown and described the preferred form of my invention I do not want to limit myself to its exact construction, but desire to make such changes as fairly fall within the scope thereof.

It will be obvious that various changes in the details of construction and in the proportions may be resorted to for successfully carrying the invention into practice without sacrificing any of the novel features or departing from the scope thereof.

Having thus described the invention, what is claimed is:

1. In a clamp the combination of a saddle having a base portion and two radial arms formed integral therewith, said base having two upwardly extending arms formed integral therewith, and disposed in a parallel relation, a cross piece secured to the upper ends of said upwardly extended arms, a sleeve formed thereby, clamping members carried by the saddle, one of said members being disposed through said sleeve, and means carried by said member for clamping both members in position.

2. In a clamp, the combination of a saddle having a base portion, a sleeve formed integral therewith, clamping members carried by said saddle, one of said members being disposed through said sleeve and having triangular catches struck up in each end thereof, the other of said members having rectangular openings formed in each end thereof adapted to receive the catches in the first mentioned member, and means mounted on said saddle and secured to said clamping members for ajustment thereof.

3. In a clamp the combination of a saddle having a base portion and a sleeve formed integral therewith, clamping members carried by said saddle, one of said members being disposed through said sleeve, means for securing said members together, one of said members being provided with a head portion having a threaded opening therein, radial arms formed integral with said head portion, an adjusting bolt threaded in said opening, said bolt being disposed through an opening in said sleeve, a head formed integral with said bolt, a groove formed in said head, and a jam nut secured on said bolt having a frictional engagement with said sleeve.

In testimony whereof I hereunto affix my signature in the presence of two witnesses.

JOHN JOSEPH HIGGINS.

Witnesses:
H. T. HIMBAUGH,
E. O. STRIEBY.

Copies of this patent may be obtained for five cents each, by addressing the "Commissioner of Patents, Washington, D. C."